(12) United States Patent
Meacham et al.

(10) Patent No.: US 9,404,534 B2
(45) Date of Patent: Aug. 2, 2016

(54) ROTATING ASSEMBLIES OF TURBOMACHINERY, FOIL JOURNAL BEARING ASSEMBLIES THEREOF, AND METHODS FOR PRODUCING JOURNALS OF THE FOIL JOURNAL BEARING ASSEMBLIES

(71) Applicant: HONEYWELL INTERNATIONAL INC., Morristown, NJ (US)

(72) Inventors: Walter Lee Meacham, Phoenix, AZ (US); Alan Margolis, Phoenix, AZ (US); Yates Wong, Humboldt, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 881 days.

(21) Appl. No.: 13/691,233

(22) Filed: Nov. 30, 2012

(65) Prior Publication Data

US 2014/0154058 A1 Jun. 5, 2014

(51) Int. Cl.
*F01D 25/16* (2006.01)
*F16C 33/00* (2006.01)
*F16C 17/02* (2006.01)

(52) U.S. Cl.
CPC .............. *F16C 33/00* (2013.01); *F01D 25/162* (2013.01); *F01D 25/166* (2013.01); *F16C 17/024* (2013.01); *F05D 2220/40* (2013.01); *F16C 2240/46* (2013.01); *Y10T 29/49639* (2015.01)

(58) Field of Classification Search
None
See application file for complete search history.

(56) References Cited

U.S. PATENT DOCUMENTS 3,413,872 A 12/1968 Haworth
4,222,618 A 9/1980 Miller, Jr.
4,725,206 A * 2/1988 Glaser ................... F01D 25/125
  415/175
5,113,670 A * 5/1992 McAuliffe .............. F01D 5/125
  417/406

(Continued)

FOREIGN PATENT DOCUMENTS

CZ   CH 438842 A  *  6/1967  ............ F01D 25/162
DE       1077007 B  *  3/1960  ............ F01D 25/164

(Continued)

OTHER PUBLICATIONS

Meacham, W.L. et al. "Dynamic Stiffness and Damping of Foil Bearings—DRAFT of "Dynamic Stiffness and Damping of Foil Bearings for Gas Turbine Engines,"'" SAE Technical Paper, published Apr. 1, 1993, Paper No. 931449.

(Continued)

*Primary Examiner* — Dwayne J White
*Assistant Examiner* — Christopher R Legendre
(74) *Attorney, Agent, or Firm* — Ingrassia Fisher & Lorenz, P.C.

(57) ABSTRACT

A rotating assembly of turbomachinery is provided. The rotating assembly includes a plurality of components mounted on a rotatable shaft within a housing of the turbomachinery and at least one foil journal bearing assembly for mounting the rotatable shaft to the housing. The foil journal bearing assembly includes an annular bearing carrier mounted to the housing. An annular bearing sleeve is disposed within the annular bearing carrier and attached thereto. The annular bearing sleeve is lined with a plurality of foils. A journal is mounted to the rotatable shaft. The journal has an outer surface engaging the foils. The journal is configured to at least one of the following: resist operational deflection thereof and reduce the effects of misalignment. A method for producing the journal of the foil journal bearing assembly is also provided.

16 Claims, 17 Drawing Sheets

(56) References Cited

U.S. PATENT DOCUMENTS

| | | | |
|---|---|---|---|
| 5,518,319 | A | 5/1996 | Selby |
| 5,911,511 | A * | 6/1999 | Saville .................. F16C 17/024 384/103 |
| 5,921,683 | A | 7/1999 | Merritt et al. |
| 6,286,303 | B1 | 9/2001 | Pfligler et al. |
| 6,439,774 | B1 | 8/2002 | Knepper et al. |
| 6,457,311 | B2 * | 10/2002 | Fledersbacher ....... F01D 25/166 417/407 |
| 8,157,543 | B2 * | 4/2012 | Shimizu ................ F01D 25/166 417/407 |
| 8,192,086 | B1 | 6/2012 | Marussich |
| 2005/0275300 | A1 | 12/2005 | El-Shafei |
| 2008/0253705 | A1 | 10/2008 | Struziak et al. |
| 2011/0033142 | A1 | 2/2011 | Kim et al. |
| 2011/0192165 | A1 | 8/2011 | Rosen et al. |
| 2014/0154058 | A1 * | 6/2014 | Meacham ............. F01D 25/166 415/170.1 |

FOREIGN PATENT DOCUMENTS

| | | | |
|---|---|---|---|
| EP | 0801217 A1 * | 10/1997 | .............. F01D 25/16 |
| EP | 1998008 A1 | 12/2008 | |
| FR | 2806126 A1 | 9/2001 | |

OTHER PUBLICATIONS

EP Search Report, EP 13190382.5-1751 dated Apr. 2, 2014.
EP Exam Report, EP 13190382.5-1751 dated Apr. 14, 2014.
EP Examination Report, EP 13190382.5-1751 dated Mar. 16, 2015.

* cited by examiner

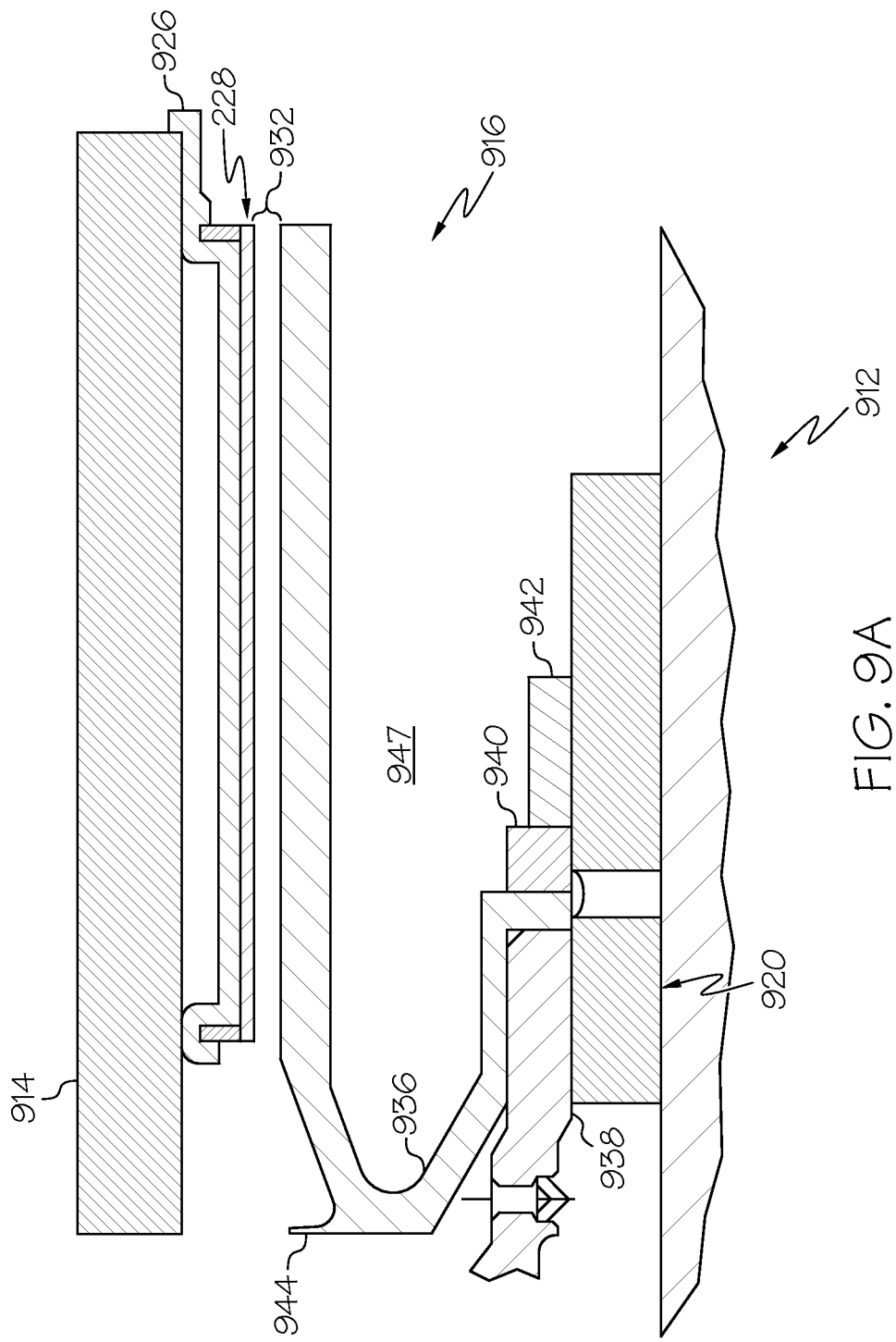

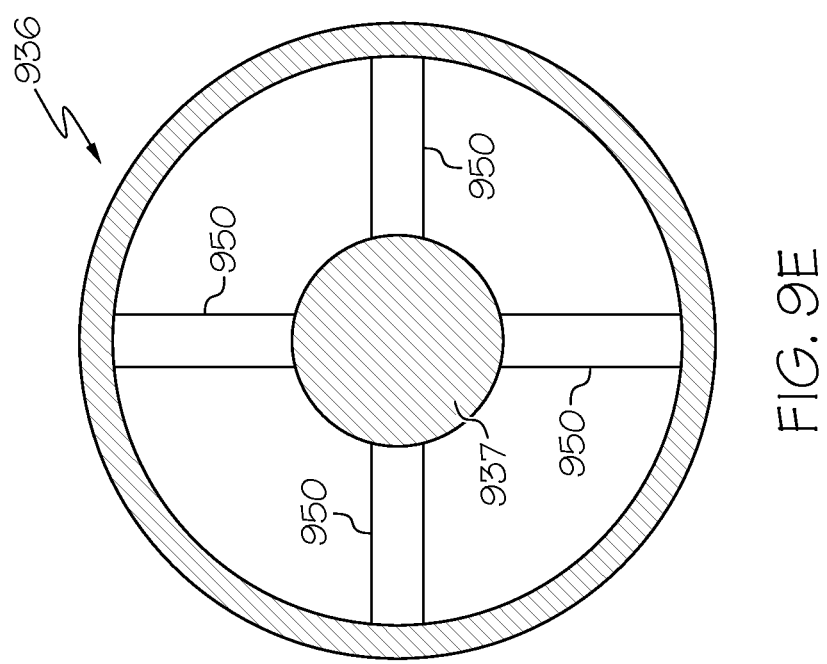
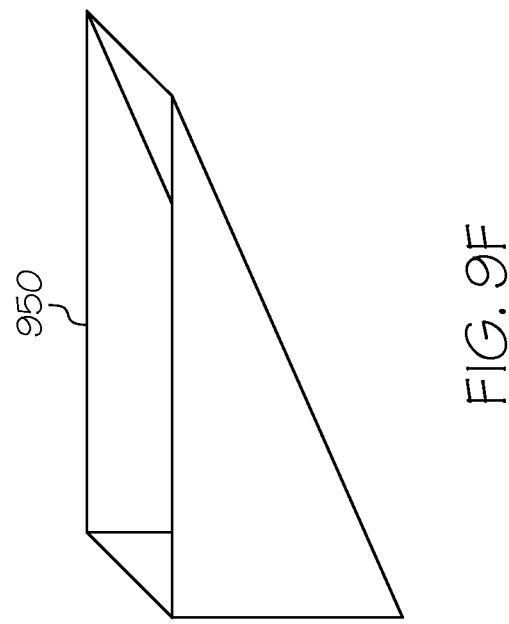

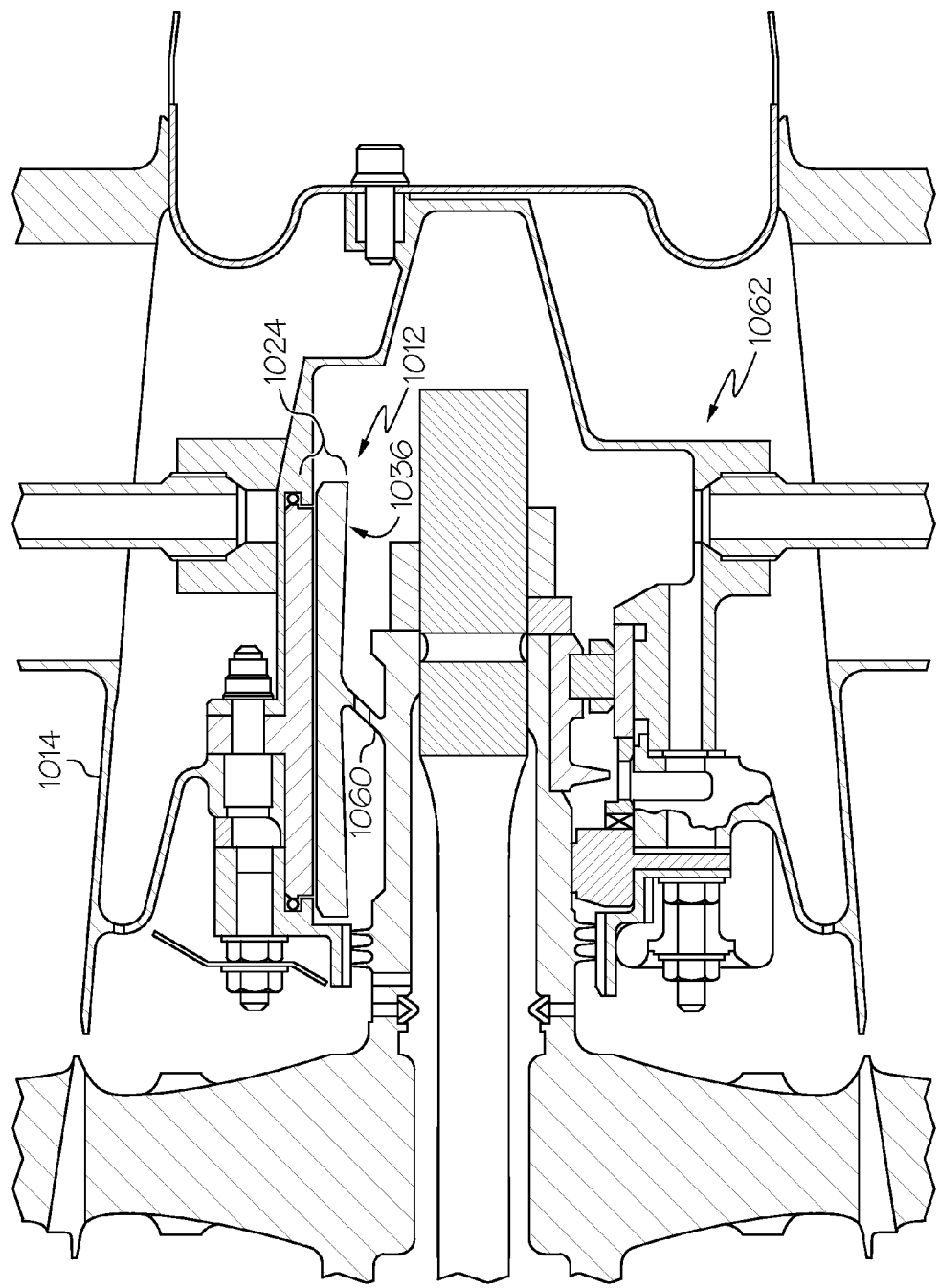

US 9,404,534 B2

ROTATING ASSEMBLIES OF TURBOMACHINERY, FOIL JOURNAL BEARING ASSEMBLIES THEREOF, AND METHODS FOR PRODUCING JOURNALS OF THE FOIL JOURNAL BEARING ASSEMBLIES

TECHNICAL FIELD

The present invention generally relates to high-speed turbomachinery, and more particularly relates to rotating assemblies of high-speed turbomachinery, foil journal bearing assemblies thereof, and methods for producing journals of the foil journal bearing assemblies.

BACKGROUND

Oil-free turbomachinery requires high-speed operations to achieve meaningful power and efficiency. Bearings may be used in a rotating assembly of turbomachinery between the rotating and stationary components. It is conventionally known to use a foil bearing as a bearing for a rotating member that rotates at a high speed (greater than 10,000 rpm). The foil bearing comprises a bearing sleeve lined with a plurality of foils including a top foil for forming a bearing surface and supporting a journal of the rotating member (a shaft) by means of pressure of a fluid drawn in between the journal and the top foil as the rotating member rotates. The foil bearing and the journal form a foil journal bearing assembly. The journal and top foil are in contact when stationary and at low journal rotational speeds. When the journal rotates at an optimum operational speed, the top foil and journal separate from each other to form an air gap (also referred to herein as "an operational running clearance.") As the air gap between the top foil and the journal grows, the pressurized fluid is drawn in to serve as a load support and act as a lubricant (instead of oil) to the rotating member and surrounding static components. The journal rotates within the bearing sleeve providing, in the interest of aerodynamic efficiency, only a desirably small operational running clearance between the rotating journal and top foil.

Unfortunately, when a conventional journal having a constant uniform diameter rotates at high speed, centrifugal forces may result in journal deflection. High-speed operations can also cause a significant temperature increase, due to large viscous heat dissipation in the fluid film between the journal and the foil bearing, as well as centrifugal growth of the journal (and decrease of film thickness). High temperature growth of the journal may result in sections of the journal growing in length axially, as well as radially outwardly producing, for example, a "distorted journal" such as, for example, a saddle-shaped journal or a concave journal. As used herein, "high temperatures" refers to temperatures above 250° F. Such elastic deformation or deflection of the journal is sometimes referred to as "flowering". As used herein, the term "deflection" and the like includes distortion, elastic deformation, flowering, or a combination thereof, unless otherwise specified. Journal deflection may result in the operational running clearance being made non-uniform along the length of the journal and/or around the circumference of the journal, i.e., insufficient in some areas and excessive in others, thereby upsetting the proper functioning of the foil journal bearing assembly, and possibly resulting in damage and even failure of the rotating assembly and/or foil journal bearing assembly. The journal may also be misaligned, also resulting in journal end-loading. Journal deflection and/or misalignment results in the distorted journal. The distorted journal may rub against the foil bearing that was designed for the conventional journal, causing uneven journal wear, particularly at the ends thereof (i.e., "end-loading"). The distorted journal may impose an uneven load distribution on the bearing surface, increasing the heat generated and thus accelerating bearing wear. Dynamic properties of the foil bearing, such as stiffness, damping, and load capacity may also be detrimentally affected by the distorted journal. Thus, journal deflection, caused primarily by high-speed centrifugal forces and thermal expansion, and journal misalignment, have a large influence on the performance of rotating and foil journal bearing assemblies in turbomachinery.

Accordingly, it is desirable to provide rotating assemblies of high-speed turbomachinery, foil journal bearing assemblies thereof, and methods for producing specially configured journals of the foil journal bearing assemblies. It is also desirable that the journals be configured to resist operational deflection that may occur during high speed and high temperature operation thereby maintaining a substantially constant uniform diameter and uniform operational running clearance and/or to reduce the effects of journal misalignment, thereby improving performance of the rotating and foil journal bearing assemblies in turbomachinery.

BRIEF SUMMARY

Rotating assemblies of turbomachinery are provided. In accordance with one exemplary embodiment, the rotating assembly comprises a plurality of components mounted on a rotatable shaft within a housing of the turbomachinery and at least one foil journal bearing assembly for mounting the rotatable shaft to the housing. The foil journal bearing assembly includes an annular bearing carrier mounted to the housing. An annular bearing sleeve is disposed within the annular bearing carrier and attached thereto. The annular bearing sleeve is lined with a plurality of foils. A journal is mounted to the rotatable shaft. The journal has an outer surface engaging the foils. The journal is configured to at least one of the following: resist operational deflection thereof and reduce the effects of misalignment.

Foil journal bearing assemblies are provided in accordance with yet another exemplary embodiment of the present invention. The foil journal bearing assembly comprises an annular bearing carrier. An annular bearing sleeve is disposed within the annular bearing carrier and attached thereto. The annular bearing sleeve is lined with a plurality of foils. A journal of the foil journal bearing assembly has an outer surface that engages the foils. The journal is adapted to rotate in close clearance relationship within the annular bearing sleeve for operation over a range of temperatures and speeds. The journal is configured to at least one of the following: resist operational deflection thereof and reduce the effects of misalignment.

Methods for producing a journal of a foil journal bearing assembly for a rotating assembly are provided in accordance with yet another exemplary embodiment of the present invention. The method comprises determining expected operational deflection of the journal under predetermined operation conditions and determining journal misalignment. The journal is configured to at least one of the following: resist the expected operational deflection and reduce the effects of journal misalignment.

Furthermore, other desirable features and characteristics of the method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 9A is a side view of another rotating assembly at rest, the rotating assembly including an exemplary foil journal bearing assembly comprising a cantilevered journal;

FIG. 9E is an end view of the configured cantilevered journal of FIG. 9D; illustrating four axial stiffening ribs extending radially from a center of thereof;

FIG. 9F is an isometric view of one of the axial stiffening ribs of FIG. 9E in isolation;

FIG. 10B is another view of the rotating assembly of FIG. 10A shown mounted for rotation to a housing of an exemplary gas turbine engine and a corresponding roller bearing arrangement;

DETAILED DESCRIPTION

Figure 1:
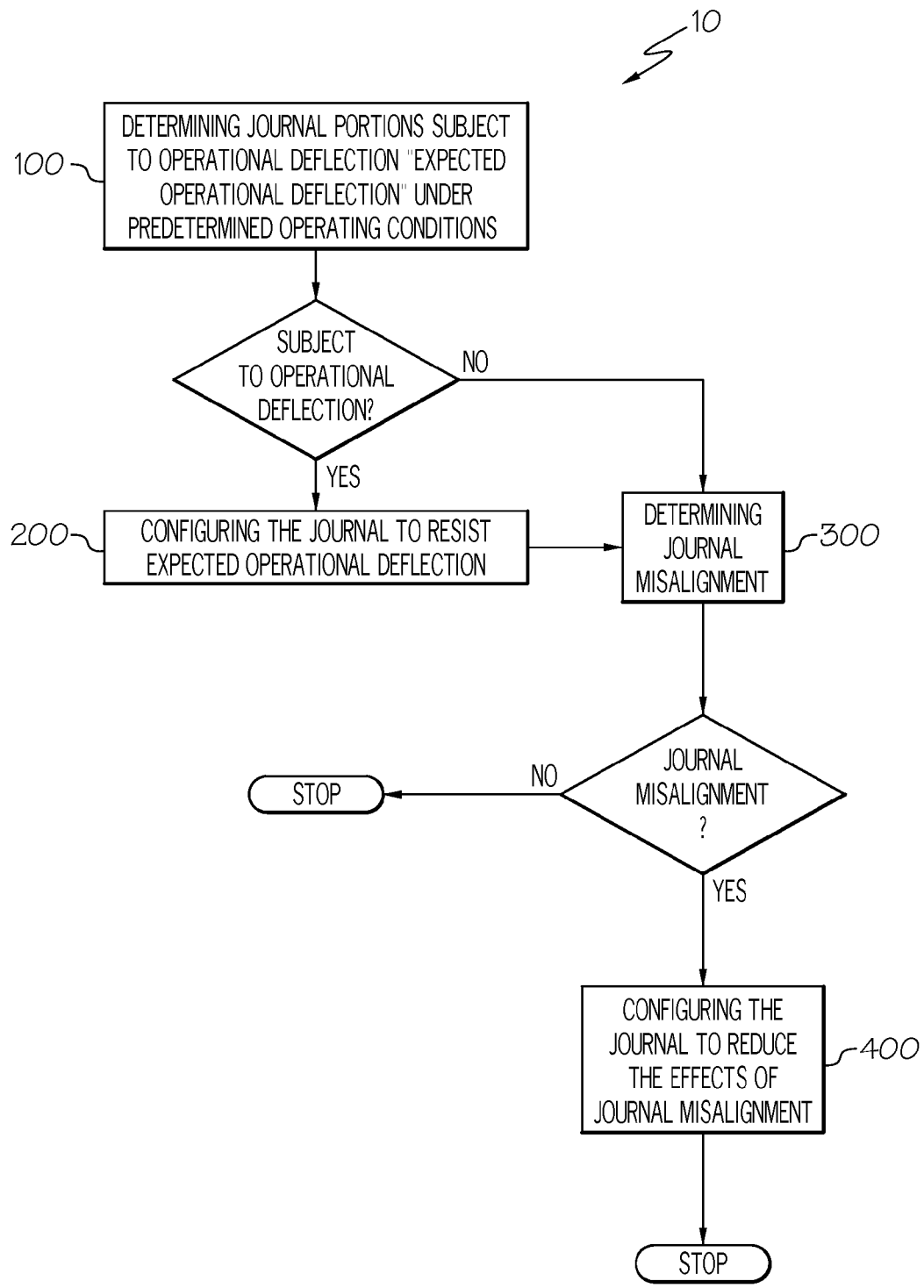
FIG. 1 is a flow chart of methods for producing journals of foil journal bearing assemblies, according to exemplary embodiments of the present invention.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various exemplary embodiments are directed to rotating assemblies for turbomachinery, foil journal bearing assemblies thereof, and methods for producing journals of the foil journal bearing assemblies. As noted previously, during operation (i.e., journal rotation), the journal may deflect as a result of high-speed centrifugal forces and thermal forces (herein referred to as "operational deflection"). As used herein, the term "deflection" and the like include distortion, elastic deformation, flowering, or a combination thereof, unless otherwise specified. The journal may also be misaligned e.g., static misalignment as a result of geometric tolerances and other factors in the design of the rotating assembly and/or operational misalignment as a result of misalignment during rotation. As used herein, the term "misalignment" means that a centerline of the journal is not concentric to a centerline of rotation as defined by the centerlines of the foil bearings. Journal deflection and/or misalignment results in a "distorted journal". For example, as temperatures increase during rotation, the journal may increase in radius R (high speed may also result in an increase in the journal radius R due to centrifugal force). High temperature growth of the journal may result in sections of the journal growing in length axially, as well as radially outwardly. Such elastic deformation of the journal caused by uneven journal growth is sometimes referred to as "flowering". Flowering of the journal and other deflections may result in the running clearance (referred to herein as the "operational running clearance") being made non-uniform along the length of the journal and/or around the circumference of the journal until running contact and damage to the journal and foil bearing may result. The dynamic properties (i.e., stiffness, damping, and load capacity) of the foil journal bearing assembly may be detrimentally affected by journal deflection and misalignment, thereby reducing performance thereof In accordance with exemplary embodiments, the journal is configured such that under predetermined operation conditions such as high rotational speed (greater than 10,000 rpm) and high temperatures (greater than about 250° F.), when a conventional journal would deflect (thereby forming the "distorted journal"), the specially configured journal will resist operational deflection and maintain a substantially constant diameter along its length, thereby maintaining a substantially uniform operational running clearance. The journal may alternatively or additionally be configured to reduce the effects of journal misalignment, if any. While the advantages of the present invention as described herein will be described with reference to particularly illustrated rotating assemblies, the teachings of the present invention are generally applicable to any journal of a foil journal bearing assembly in a rotating assembly for use in turbomachinery to resist operational deflection and/or resist the effects of misalignment. Other embodiments may be differently arranged from that depicted. Exemplary turbomachinery includes gas turbine engines, air cycle machines, turbochargers, auxiliary power units (APU), or the like.

Referring to FIG. 1, in accordance with exemplary embodiments, a method 10 for producing a journal of a foil journal bearing assembly for a rotor assembly begins by determining the journal portions subject to operational deflection ("expected operational deflection") under predetermined operating conditions (step 100). The expected operational deflection is determined by analysis of the rotating assembly layout, as well known to one skilled in the art. Such analyses include, for example, rotor-dynamics analysis, finite element analysis (FEA), and review of geometric tolerances or the like. As noted previously, the journal may deflect during operation (rotation) (hereinafter referred to as "operational deflection"), as a result of high speed centrifugal forces and high temperatures. The journal deflects at one or more journal portions as hereinafter described. As well known to one skilled in the art, the rotating assembly layout varies depending upon intended application, loads, temperatures, performance, weight, size requirements, etc. If it is determined that no journal portions are subject to operational deflection, the following step 200 may be omitted.

Figure 2:
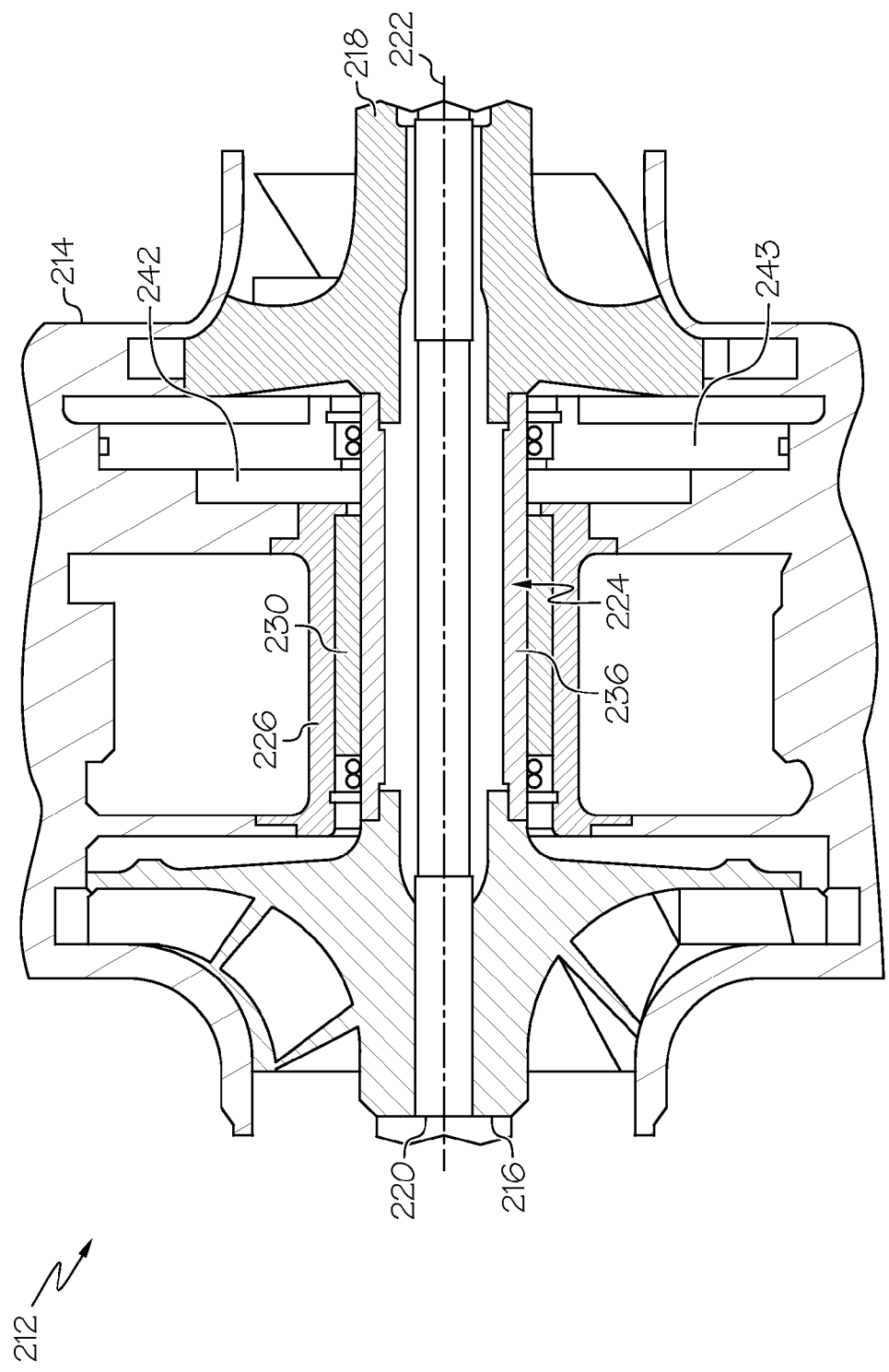
FIG. 2 is a horizontal cross-sectional view of an exemplary conventional rotating assembly at rest and mounted within a stationary housing of turbomachinery and generally comprising a plurality of rotating components coupled by a rotating shaft supported on at least one foil journal bearing assembly.
Figure 3:
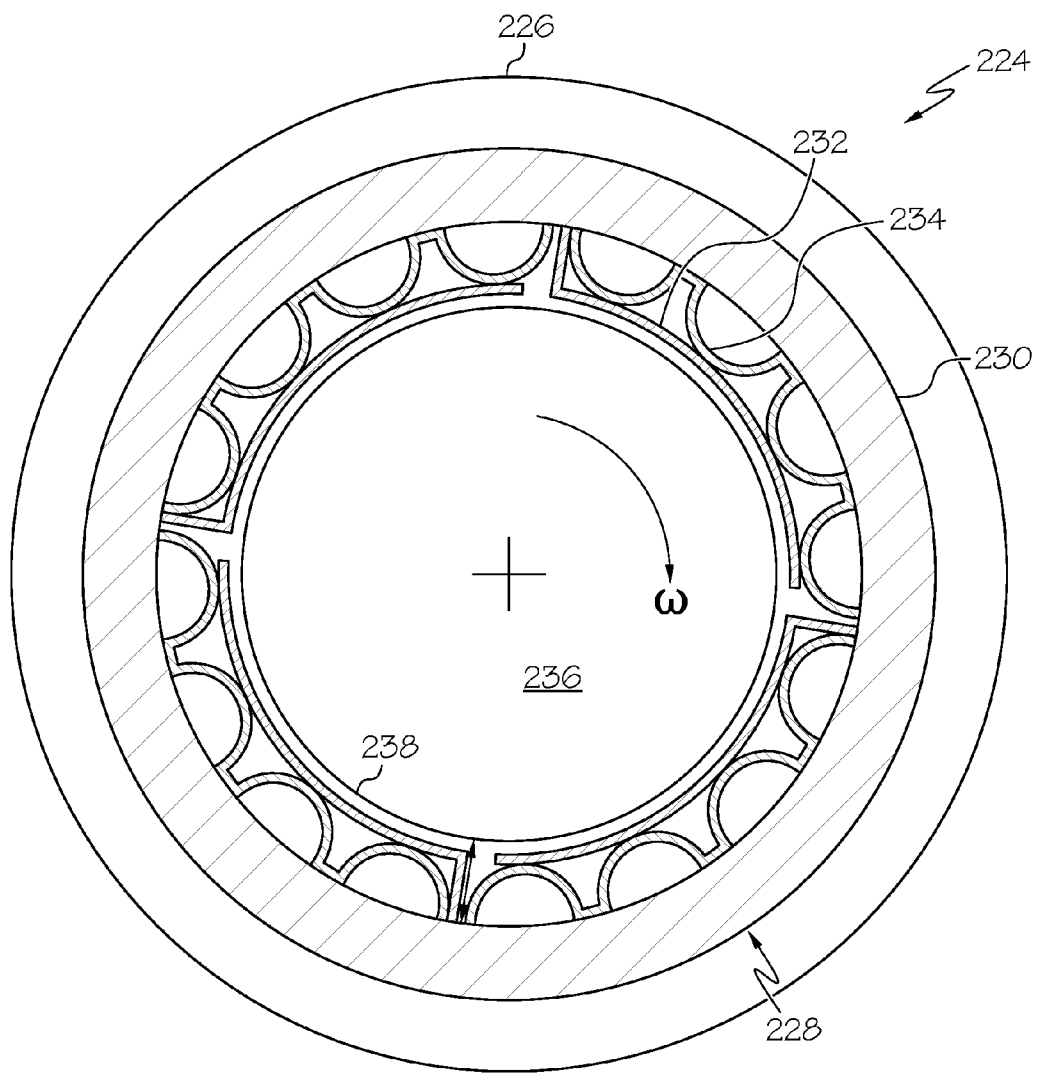
FIG. 3 is a cross-sectional view of an exemplary foil journal bearing assembly of FIG. 2.
Figure 4:
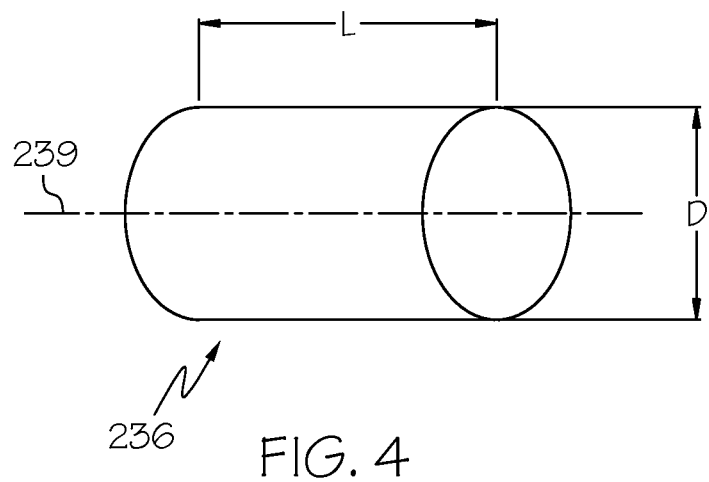
FIG. 4 is an isometric view of a conventional journal (in insolation) of a foil journal bearing assembly (not shown in FIG. 4), the conventional journal having a substantially constant outer diameter D along the length thereof.
Figure 5:
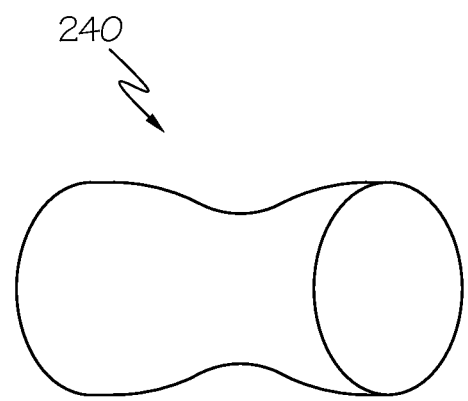
FIG. 5 is an isometric view of a distorted journal in isolation resulting from operational deflection of the journal of FIGS. 2 and 4.

FIG. 2 is a cross-sectional view of an exemplary conventional rotating assembly, generally designated as reference numeral 212, for use in turbomachinery (not shown in FIG. 2). As illustrated, the rotating assembly 212 is mounted within a stationary housing 214 and generally comprises a plurality of rotating components 216 and 218 connected by a tieshaft 220. The plurality of rotating components comprises a first rotating component 216 and a second rotating component 218. For a gas turbine engine, air cycle machine, or turbocharger, the rotating components may comprise at least one compressor and at least one turbine mounted on the shaft. The rotating assembly 212 is mounted to the stationary housing 214 and supported for rotation within the turbomachinery about a central longitudinal axis 222 by at least one foil journal bearing assembly 224 located between the first and second rotating components 216 and 218. The rotating assembly 212 supported by the at least one foil journal bearing assembly 224 will move relative to the stationary housing as various forces are imposed onto the shaft. The illustrated foil journal bearing assembly 224 of FIGS. 2 and 3 comprises an annular bearing carrier 226 mounted to or integral with the housing 214 (not shown in FIG. 3), a foil bearing 228 comprising an annular bearing sleeve 230 disposed within and attached to the annular bearing carrier and lined with a plurality of foils including a top foil 232 and a bump foil 234, and a journal 236 mounted to the housing 214 (not shown in FIG. 3) and having an outer surface 238 engaging the top foil 232 when at rest. While a particular foil bearing is included in the foil journal bearing assembly of FIG. 3, it is to be understood that foil bearings of other configurations may be used in the foil journal bearing assemblies according to exemplary embodiments. The journal 236 at rest has a substantially constant outer diameter D along the length L thereof about a central line of rotation 239 as shown in FIG. 4, an isometric view of the resting journal in isolation. The journal 236 of FIGS. 2 and 4 is shown distorted in FIG. 5, the exemplary distorted journal 240 of FIG. 5 having a variable axial diameter as a result of journal end portion deflection during rotation. The distorted journal 240 may be deflected in a location and manner other than that depicted. For example, the distorted journal may have a variable axial diameter as a result of journal mid-portion deflection. A foil thrust bearing 242 and thrust bearing housing 243 are mounted between the foil journal bearing assembly 224 and the second rotating component 218 and prevents the rotating assembly 212 from moving axially. A tieshaft 220 and tieshaft nut (not shown in FIG. 2) compressively retain the first and second rotating components and the foil journal bearing assembly 224 together, and compressively preloads the foil journal bearing assembly.

Figure 6:
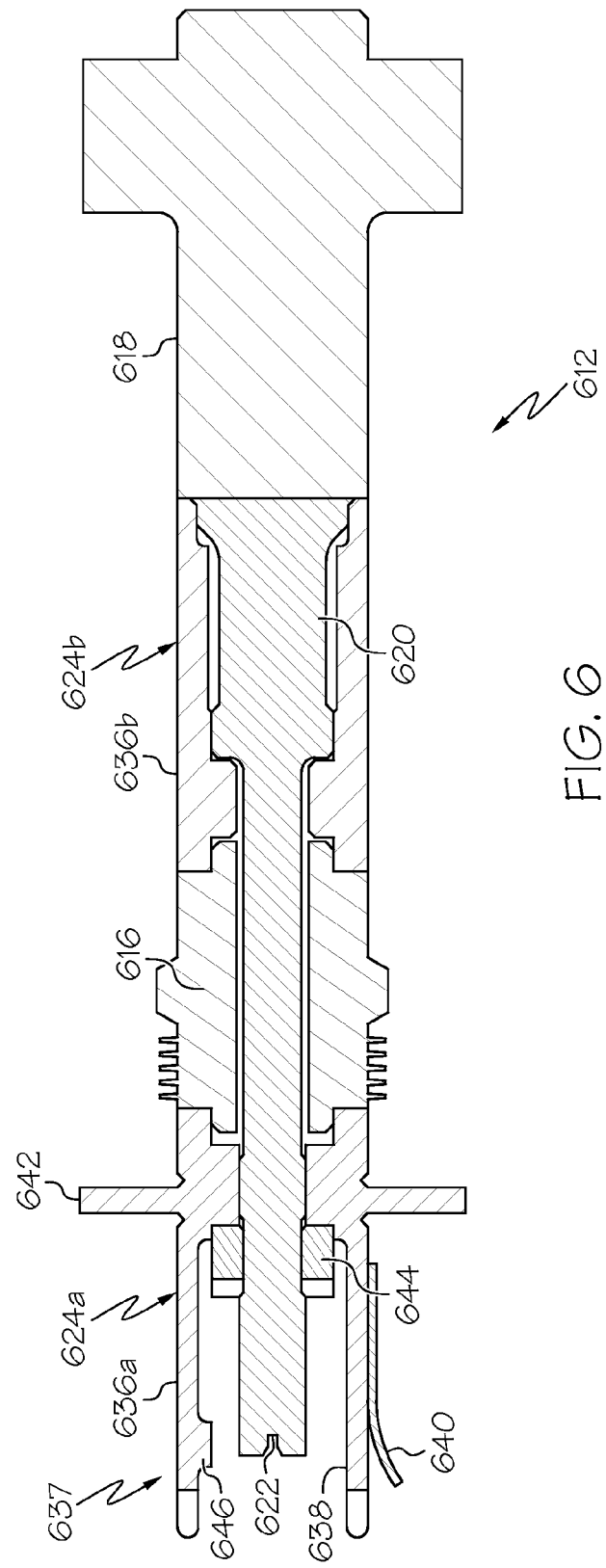
FIG. 6 is a cross-sectional view of another exemplary conventional rotating assembly, the illustrated rotating assembly including a distorted overhung journal in a forward foil journal bearing assembly resulting from operational deflection of a forward end portion of the journal and the forward end portion of the journal configured with a circumferential stiffening rib to resist such deflection, in accordance with exemplary embodiments, the forward end portion shown both deflected and specially configured for ease of illustration only.

Referring again to FIG. 1 and now to FIG. 6, in accordance with exemplary embodiments, the method 10 for producing the journal of the foil journal bearing assembly continues by configuring the journal to resist the expected operational deflection (step 200). FIG. 6 is a cross-sectional view of another exemplary rotating assembly 612 that may be used, for example, in a testing rig intended to simulate a gas turbine engine so that the system dynamics may be validated. The illustrated rotating assembly is mounted within the housing of the testing rig (the housing and testing rig are not shown in FIG. 6). The illustrated rotating assembly 612 of FIG. 6 generally comprises a first rotating component 616 and a second rotating component 618. In the testing rig, the second rotating component may be simulated. The rotating assembly 612 is mounted to the stationary housing (not shown in FIG. 6) and supported for rotation within the turbomachinery about a central longitudinal axis 622 by a forward foil journal bearing assembly 624a and an aft foil journal bearing assembly 624b. The forward foil journal bearing assembly 624a is located outboard of the first rotating component 616 to provide an "overhung journal" design. A journal 636a of the forward foil journal bearing assembly 624a is cantilevered. The aft foil journal bearing assembly 624b includes journal 636b. The forward and aft foil journal bearing assemblies provide radial support. A foil thrust bearing 642 is mounted between the forward foil journal bearing assembly 624a and the first rotating component 616 and prevents the rotating assembly 612 from moving axially. A tieshaft 620 and tieshaft nut(s) 644 compressively retain the first and second rotating components and the forward and aft foil journal bearing assemblies together, and compressively preloads the foil journal bearing assemblies.

During operation (i.e., journal rotation), a forward end portion 638 of journal 636a is expected to grow greater than an aft end portion of the same journal, resulting in a variation in journal diameter along the length thereof, forming a distorted journal 640 as also shown in FIG. 6. In accordance with exemplary embodiments, the journal 636a (in this case, of the forward foil journal bearing assembly) is configured to include a circumferential stiffening rib 646 at the forward end portion 638 thereof to increase the cross-sectional thickness of the journal thereat, resulting in substantially uniform operational deflections along the length of the journal and thus a substantially constant outer diameter of the journal will be maintained. The journal 636a with the circumferential stiffening rib 646 may be referred to herein as a specially configured journal 637. The forward end portion 638 of the journal 636a is shown both deflected and configured with a circumferential stiffening rib 646 for ease of illustration only. It is to be understood that journal 637 is configured with the circumferential stiffening rib at the forward end portion 638 to resist deflection thereat. By the same token, the distorted overhung journal 640 with the deflected forward end portion 638 does not include the circumferential stiffening rib.

Figure 7:
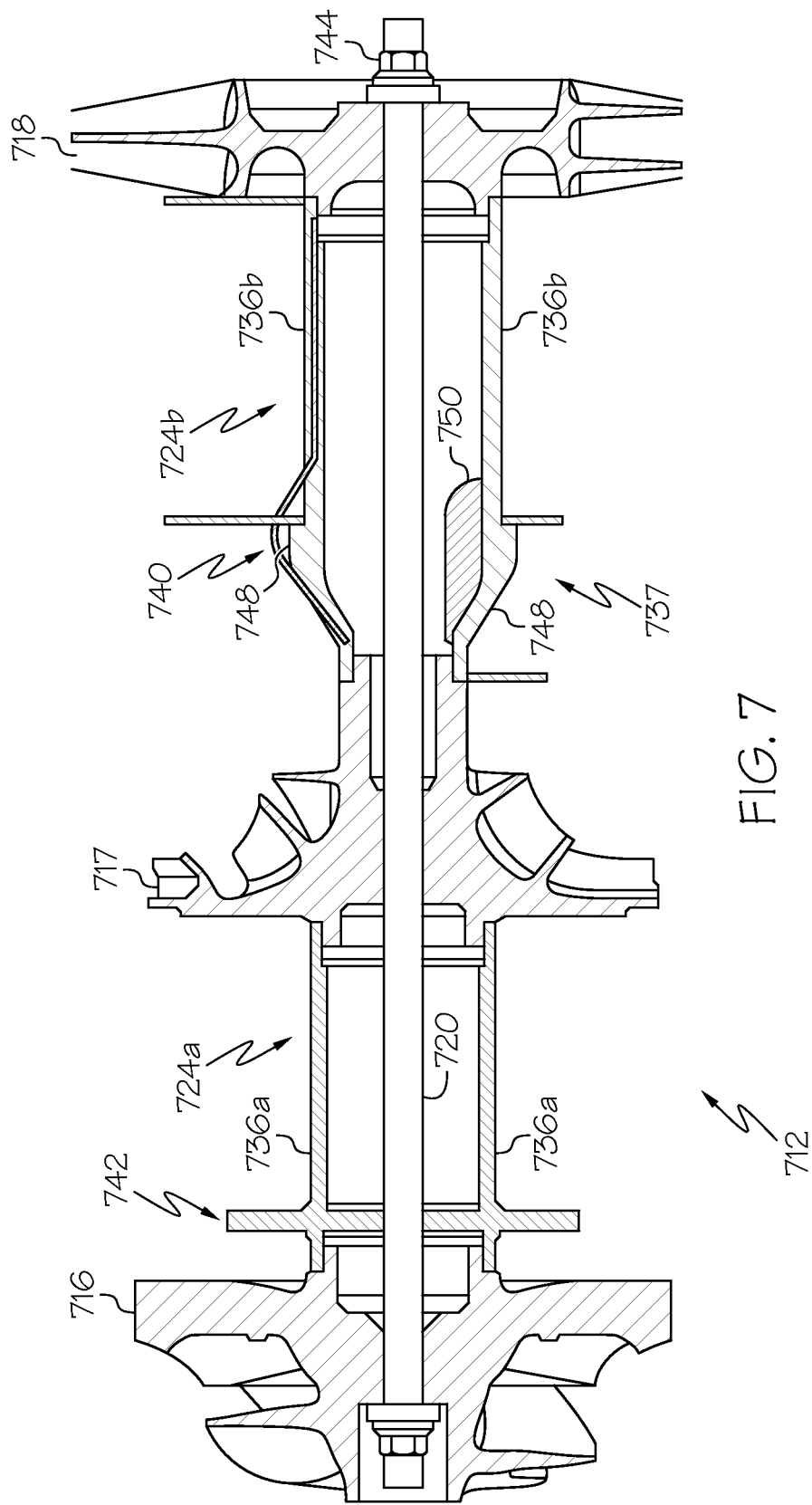
FIG. 7 is a cross-sectional view of another exemplary conventional rotating assembly including a pair of foil journal bearing assemblies and a tieshaft for compressively coupling the plurality of rotating components together, the illustrated rotating assembly including an aft foil journal bearing assembly including a distorted journal having a deflected conical extension portion and the conical extension portion of the journal alternately configured with an axial stiffening rib on the inner diameter thereof or with a thicker cross section to resist operational deflection, in accordance with exemplary embodiments, the conical extension portion shown both deflected and specially configured for ease of illustration only.
Figure 8:
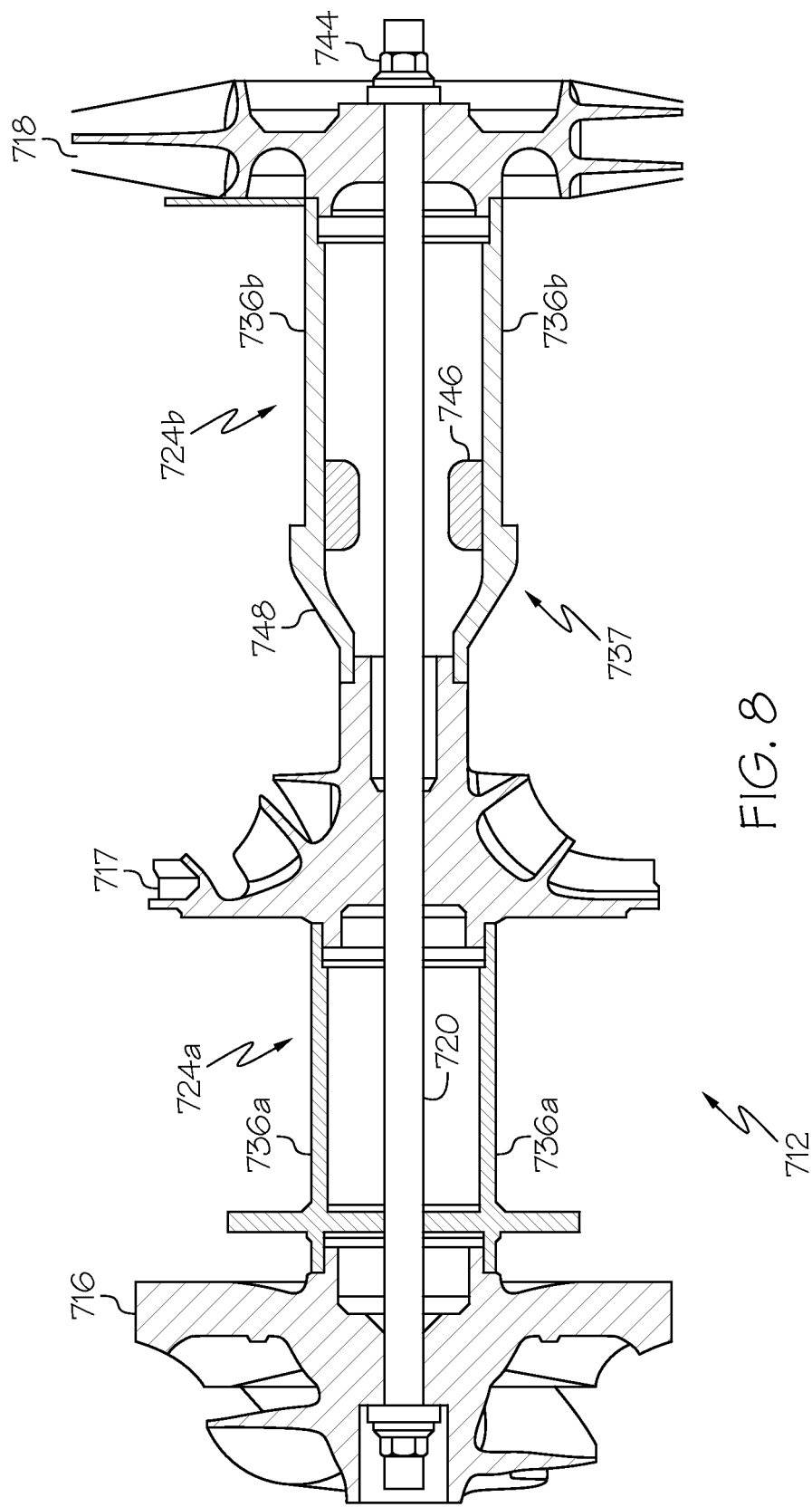
FIG. 8 is a cross-sectional view of the conventional rotating assembly of FIG. 7, illustrating the journal alternately configured with at least one circumferential stiffening rib at the location subject to operational deflection, in accordance with exemplary embodiments.

Referring now to FIGS. 7 and 8, a cross-sectional view of another exemplary rotating assembly 712 is shown. As illustrated, the rotating assembly 712 includes a plurality of rotating components 716, 717, and 718 mounted within a stationary housing of the turbomachinery (the housing and turbomachinery are not shown in FIGS. 7 and 8) and supported by a forward foil journal bearing assembly 724a and an aft foil journal bearing assembly 724b. The illustrated exemplary rotating components are a radial turbine 716, a radial compressor 717, and an axial turbine 718. The forward and aft foil journal bearing assemblies are as described above in connection with foil journal bearing assemblies 624a and 624b. A foil thrust bearing 742 is mounted between the forward foil journal bearing assembly and the radial turbine to prevent the rotating assembly from moving axially. A journal 736b of the aft foil journal bearing assembly includes a conical extension portion 748 having a relatively thin cross-section. A tieshaft 720 and tieshaft nut 744 clamp the rotating components together along with the forward and aft foil journal bearing assemblies and the foil thrust bearing. The tieshaft is used to couple the rotating components together and compressively retain the radial compressor between the radial turbine and the axial turbine, and compressively preload the foil bearings.

During rotation, the conical extension portion 748 of the journal 736b of aft foil journal bearing assembly 724b is expected to deflect into a distorted journal 740 (FIG. 7) as a result of the compression loaded by the tieshaft, and changes in tieshaft load due to high speed centrifugal forces and high temperatures. In accordance with exemplary embodiments, the conical extension portion of the illustrated journal 736b of aft foil journal bearing assembly 724b is configured with a thicker cross section to resist such operational deflection. The cross-sectional thickness of the conical extension portion of the journal itself may be increased or the cross-sectional thickness may be increased by configuring the journal with at least one stiffening rib (an axial stiffening rib 750 is illustrated in FIG. 7 and a circumferential stiffening rib 746 is illustrated in FIG. 8) at the inner diameter of the conical extension portion of the journal, thereby forming a specially configured journal 737 that resists uneven journal growth (i.e., operational deflection) thereof during rotation. Selecting an axial stiffening rib or a circumferential stiffening rib depends on weight and manufacturing considerations. The conical extension portion 748 of the journal 736b is shown both deflected and configured with at least one stiffening rib for ease of illustration only. It is to be understood that the journal 736b is configured with the at least one stiffening rib to resist deflection thereat. By the same token, the distorted journal 740 does not include the at least one stiffening rib.

Referring now to FIGS. 9A through 9D, a cross-sectional view of another exemplary rotating assembly 912 at rest is shown. The illustrated rotating assembly 912 comprises an annular bearing carrier 926 which is mounted, in a manner known to one skilled in the art, to a structural member such as a stationary housing 914. The annular bearing carrier 926 includes a foil bearing 228 such as illustrated in FIG. 3. The foils engage the journal 936 which is mounted to a rotatable shaft 920 by a shaft coupler 938, spacer 940 and tightening nut 942. A labyrinth seal 944 or knife edge seals between the journal and bearing sleeve of the foil bearing. This enables the seal that is used to pressurize the foils to be integral with the journal. The journal 936 is configured to define a cavity 947 between it and the other rotating components 916, such as the turbine and the compressor which are secured by shaft 920, etc., for purposes as hereinafter described. The labyrinth seal controls the pressure in the cavity. The journal is supported at an aft end portion only and is therefore referred to herein as a "cantilevered journal".

Figure 9B:
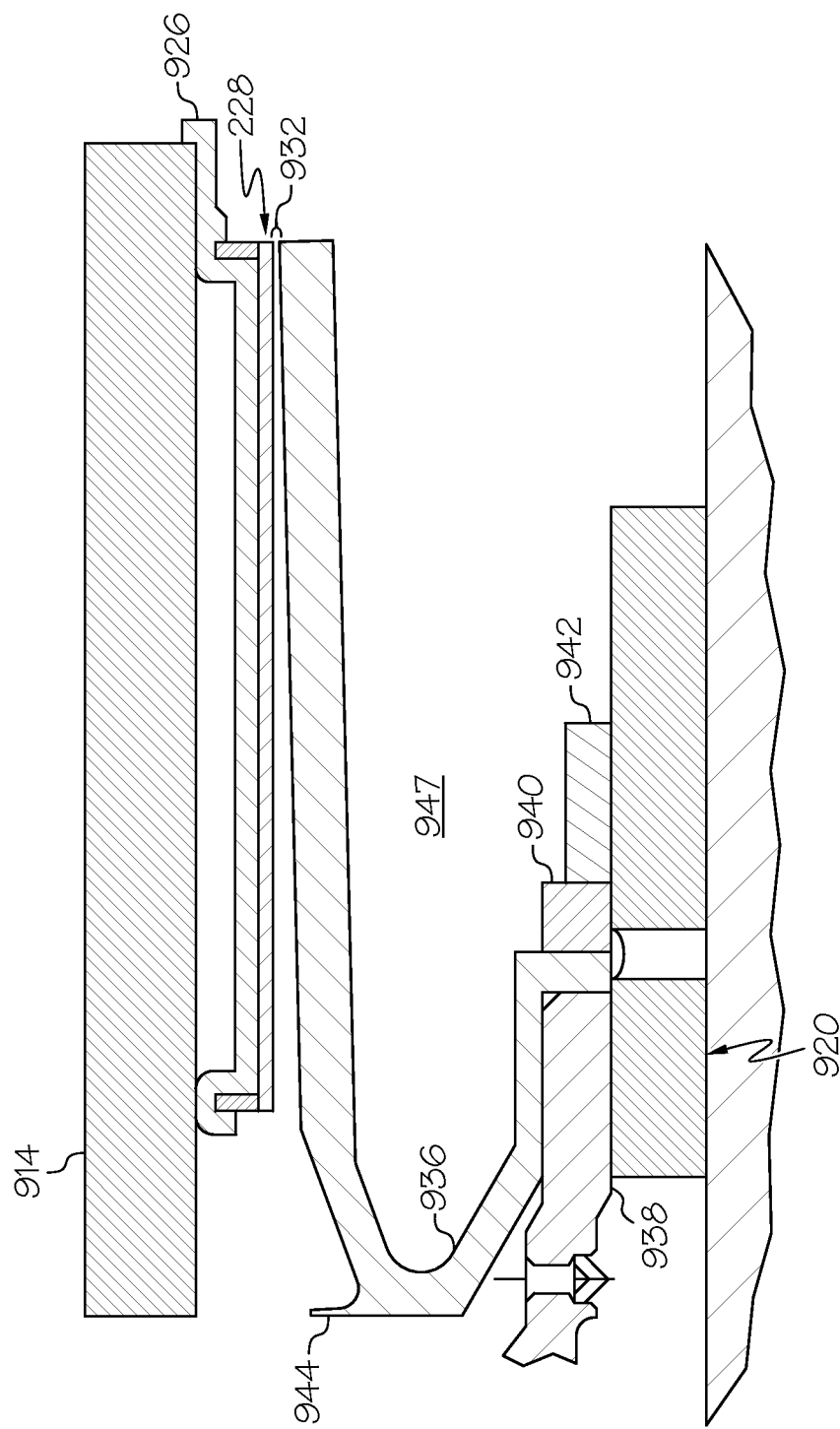
FIG. 9B is similar to FIG. 9A, illustrating a distorted cantilevered journal resulting from operational deflection of the cantilevered journal of FIG. 9A.
Figure 9C:
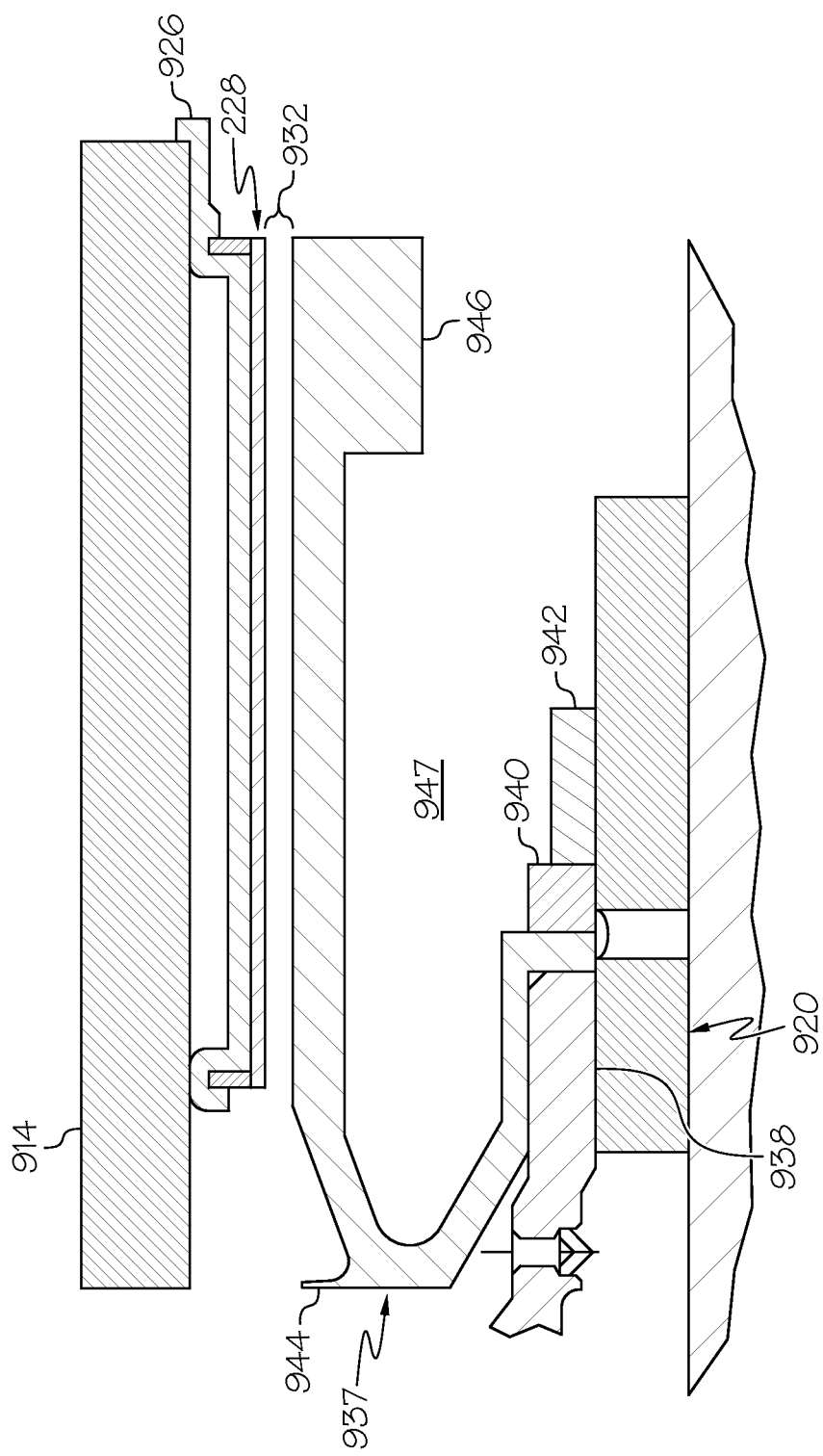
FIG. 9C illustrates the cantilevered journal of FIG. 9A configured with a circumferential stiffening rib to resist operational deflection, according to exemplary embodiments.
Figure 9D:
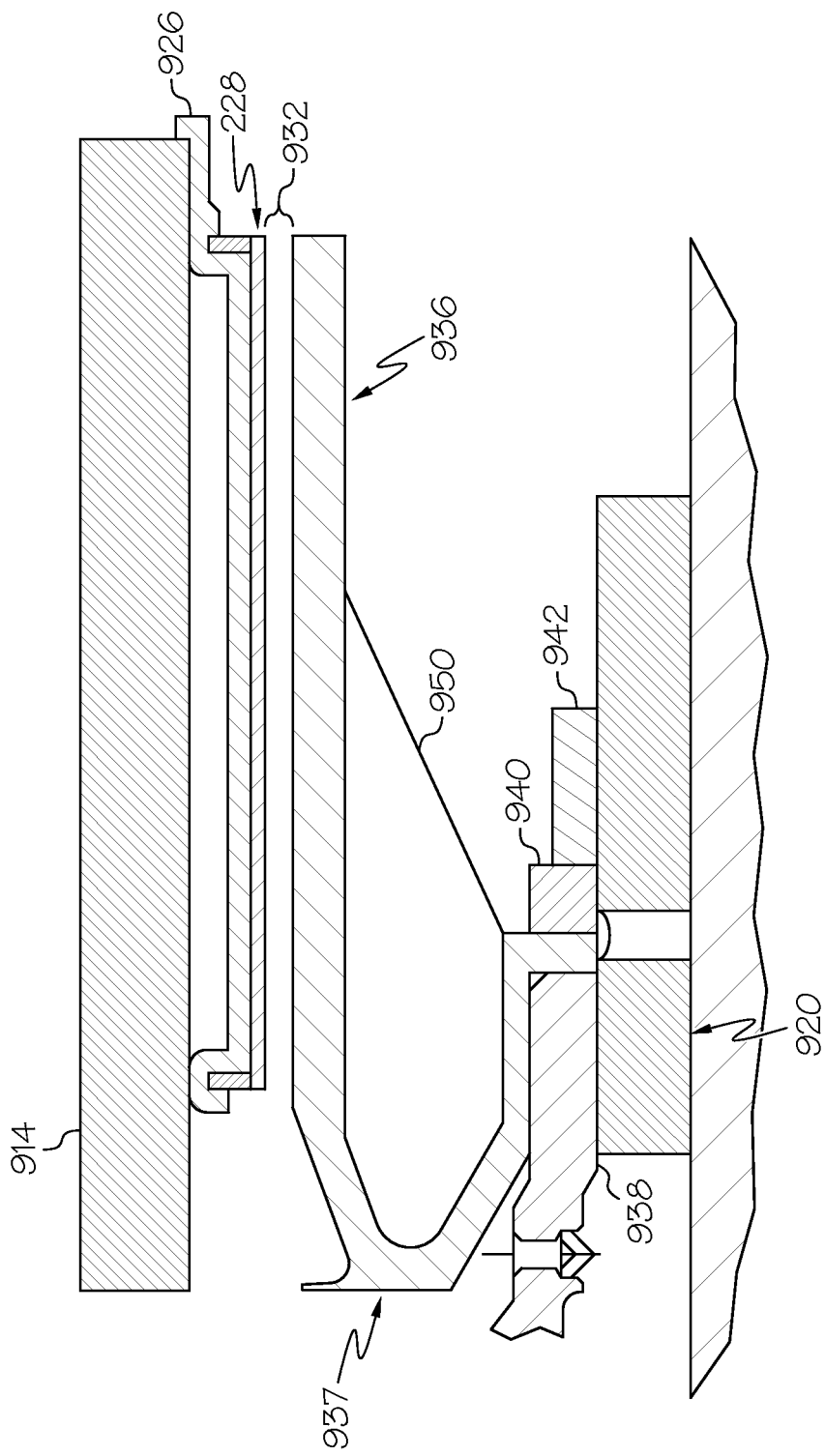
FIG. 9D illustrates the cantilevered journal of FIG. 9A configured with a plurality of axial stiffening ribs, according to exemplary embodiments.

During operation (i.e., journal rotation) as shown in FIG. 9B, the radial growth of the cantilevered journal varies along the axial length thereof Thus journal growth exhibits non-linear behavior, with radial forces that vary in the circumferential direction. More specifically, the forward end portion of the cantilevered journal experiences more radial growth during rotation than the opposing aft end portion of the cantilevered journal resulting in journal flowering, thereby decreasing the operational running clearance 932 on the right relative to the operational running clearance on the left, resulting in a non-uniform operational running clearance, i.e., a wedge-shaped operational running clearance gap of non-uniform width may be formed.

Referring now to FIGS. 9C through 9F, in accordance with exemplary embodiments, the cantilevered journal 936 of FIGS. 9A and 9B may be configured to include at least one circumferential stiffening rib 946 (FIG. 9C) or at least one axial stiffening rib 950 (FIGS. 9D through 9F) (the resulting journal referred to herein as a "specially configured journal" 937), thereby substantially controlling radial growth of the aft end portion of the journal during rotation and substantially maintaining a substantially uniform operational running clearance with the surrounding foil bearing. The circumferential stiffening rib 946 extends circumferentially from the journal at the forward end portion of the journal (FIG. 9C) to increase the cross-sectional thickness thereat. The at least one axial stiffening rib 950 in FIGS. 9D through 9F comprises a plurality of triangular stiffening ribs that support the journal and extend axially along a portion thereof and radially from a mid-portion of the cantilevered journal. Each axial stiffening rib is inserted into the cavity formed by the cantilevered journal and held in place. The illustrated axial stiffening ribs are substantially 90 degree angle ribs, and may alternatively be integrally formed with the specially configured journal 937. It is to be understood that the number, shape, and configuration of the axial stiffening ribs may be other than that depicted.

Figure 10A:
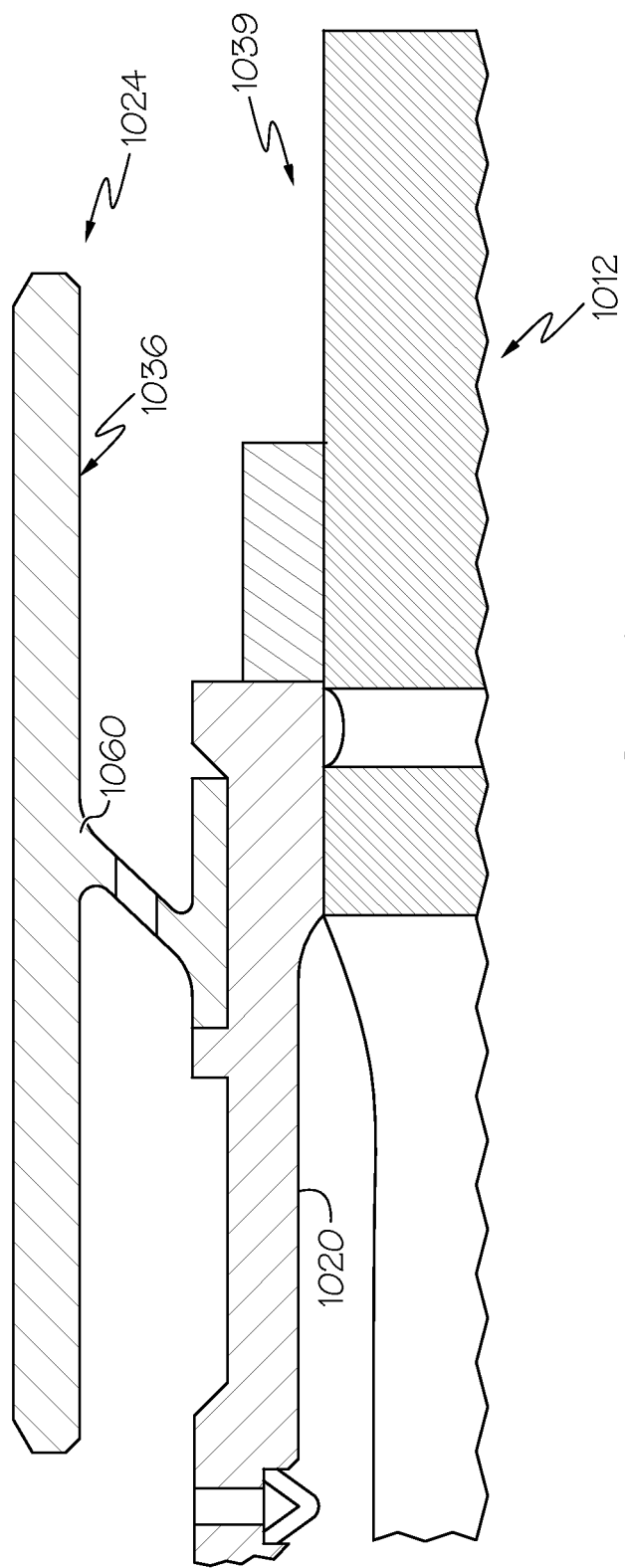
FIG. 10A is a cross-sectional view of another exemplary conventional rotating assembly at rest including a foil journal bearing assembly (shown schematically) comprising a mid-span supported journal having a substantially constant diameter along the length thereof.

Referring now to FIGS. 10A through 10D, FIG. 10A is a cross-sectional view of another conventional rotating assembly comprising a rotating shaft assembly 1039 and a foil journal bearing assembly 1024 for supporting a shaft 1020 of the rotating shaft assembly. In FIG. 10B, the rotating assembly 1012 of FIG. 10A is shown mounted for rotation to a stationary housing 1014 of an exemplary gas turbine engine 5 on the foil journal bearing assembly 1024. The journal 1036 of the illustrated foil journal bearing assembly 1024 is supported in a mid-span portion by a support structure 1060. The journal of FIGS. 10A and 10B has a substantially constant diameter along the length thereof. A conventional roller bearing assembly 1062 is also illustrated in FIG. 10B.

Figure 10C:
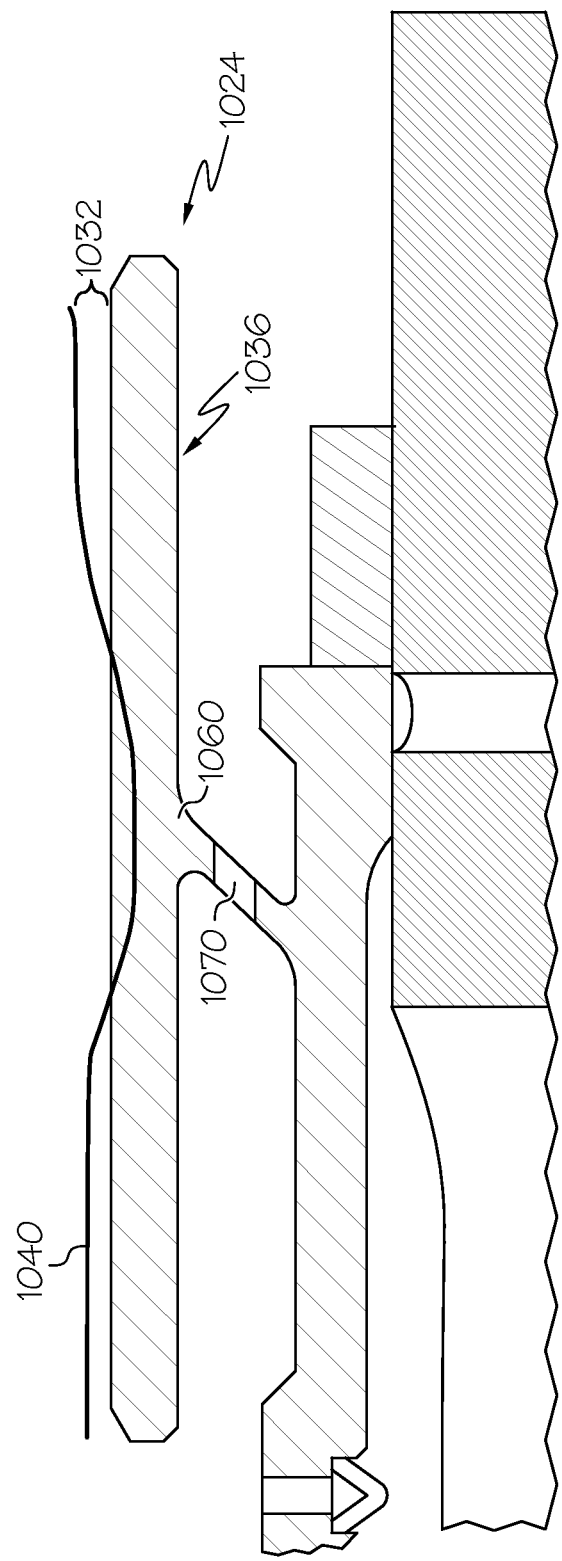
FIG. 10C is a cross-sectional view of the rotating assembly similar to FIG. 10A, illustrating a distorted mid-span supported journal resulting from operational deflection of the mid-span supported journal of FIG. 10A.
Figure 10D:
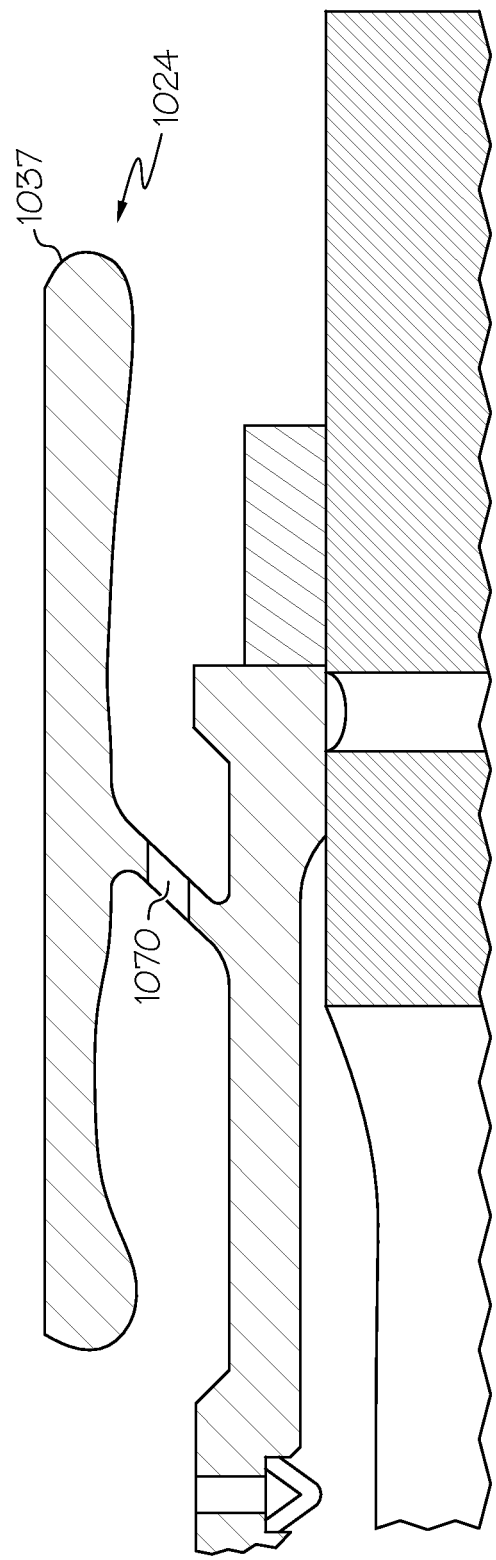
FIG. 10D illustrates the mid-span supported journal of FIG. 10A configured with a thicker cross section at end portions thereof to resist operational deflection, according to exemplary embodiments.

During operation, as shown in FIG. 10C, growth of the journal mid-span is restricted by the support structure 1060 so the journal forward and aft end portions grow more, undesirably resulting in a U-shaped distorted journal 1040 (a "deflected concave shape") and reduced operational running clearance at the journal ends and increased operational running clearance 1032 mid-span (i.e., a non-uniform operational running clearance). Referring now to FIG. 10D, in accordance with exemplary embodiments, the end portions of the mid-span supported journal 1036 of FIG. 10C are configured with a thicker cross section (the specially configured journal identified in FIG. 10D with the reference numeral 1037) to limit radial growth at the journal end portions, thereby maintaining a substantially constant outer diameter along the length thereof during operation, and thus maintaining a substantially constant operational running clearance. The cross-sectional thickness of the end portions may be increased by increasing the cross-sectional thickness of the journal itself as illustrated or by inclusion of the at least one stiffening rib at one or both of the journal ends. As hereinafter described, the specially configured journal 1037 of FIG. 10D with the thicker cross section end portions also reduces the effects of journal misalignment, if any.

As further illustrated in FIG. 10D, the foil journal bearing assembly 1024 may further comprise means for circulating cooling fluid through one or more internal passages (not shown) of the journal to control thermal growth and distortion thereof from thermal gradients. For example, a cooling inlet 1070 of an internal passage is shown in the mid-span support structure to allow the flow of cooling fluid (typically air) from one end to the other end of the journal.

Figure 11:
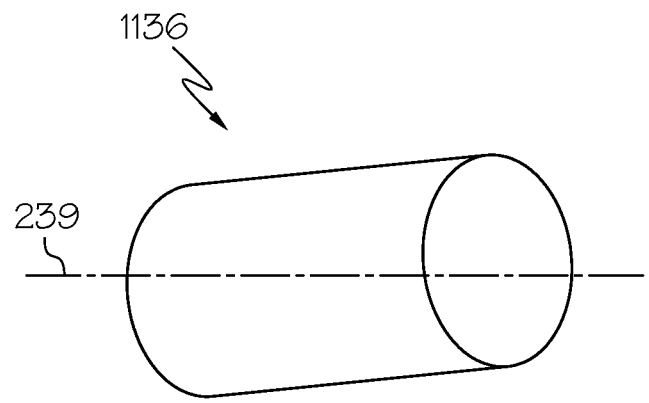
FIG. 11 is an isometric view of a misaligned journal (in isolation) of a foil journal bearing assembly (not shown in FIG. 11)
Figure 12:
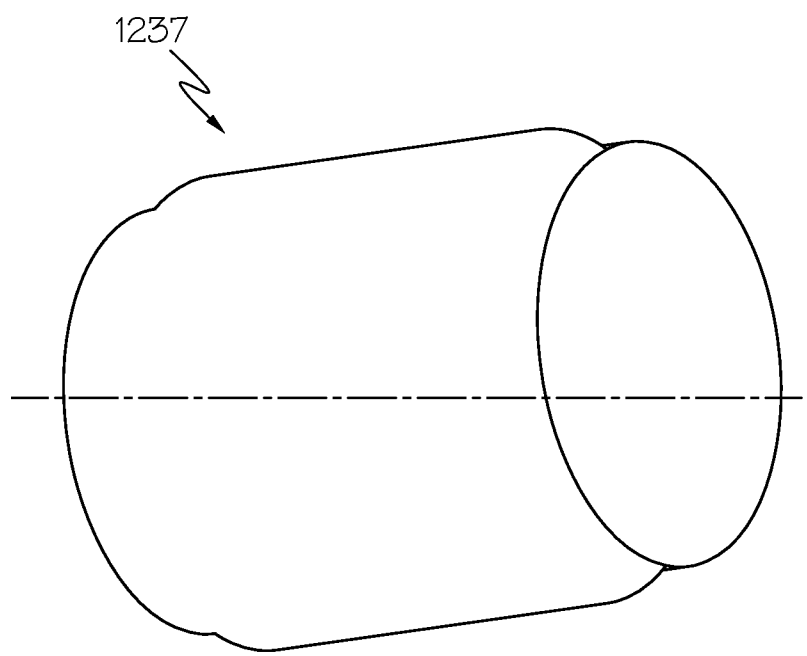
FIG. 12 is an isometric view of the misaligned journal of FIG. 11 configured with reduced outer diameter end portions to reduce the effects of misalignment, in accordance with exemplary embodiments.

Referring again to FIG. 1 and now to FIGS. 11 through 12, according to exemplary embodiments, the method 10 for producing a journal of the foil journal bearing assembly further comprises determining whether there is journal misalignment in the rotating assembly layout (static misalignment) or expected operational misalignment under the predetermined operating conditions (step 300). It is to be understood that step 300 may be performed with step 100, before step 100, after step 100, and/or without step 200. If a determination is made in step 300 that static misalignment does not exist in the rotating assembly layout and/or that operational misalignment is not expected, step 400 as hereinafter described is not performed.

However, if a determination is made in step 300 that static misalignment exists and/or that operational misalignment is expected, according to exemplary embodiments, the method 10 for producing a journal of the foil journal bearing assembly comprises configuring the journal performed prior to, with, or after step 200. As noted previously, journal misalignment may exist without journal deflection (e.g., FIG. 12). An isometric view of an exemplary misaligned journal 1136 in isolation is shown in FIG. 11. It is also to be understood that other journals, such as the journals illustrated in FIGS. 6 through 9A and 10A, may be misaligned. Journal misalignment, like journal deflection, may undesirably reduce load capacity and cause foil end loading.

Still referring to FIG. 12, in accordance with exemplary embodiments, the misaligned journal 1136 of FIG. 11 may be configured to have reduced diameter ends (the exemplary journal configured in this manner is identified in FIG. 12 with the reference numeral 1237 and is an exemplary "specially configured journal") to reduce the effects of journal misalignment including reducing end deflections to substantially prevent journal end-loading. The diameter of each journal end may be reduced about 0.025% to about 0.05% and about 2.5% of the journal length at each end may have the reduced diameter relative to a conventional journal with a substantially constant outer diameter. The effects of journal misalignment may alternatively be reduced by configuring the end portions of the journal with an increased cross-sectional thickness. As previously described, the cross-sectional thickness may be increased by increasing the cross-sectional thickness of the journal itself (in this case, at the journal ends) as shown, for example, in FIG. 10D, or by inclusion of at least one stiffening rib at the journal ends.

Reducing the outer diameter of the journal ends reduces the effects of journal misalignment. Configuring the end portions of the journal with an increased cross-sectional thickness both reduces the effects of journal misalignment and makes the configured journal resistant to operational deflection thereat. Therefore, for a journal determined to be subject to operational deflection and misalignment (operational and/or static misalignment), the journal may be configured to both resist the operational deflection and to reduce the effects of journal misalignment. For example, if the journal end portions are determined to be subject to operational deflection (e.g., such as in mid-span supported journal of FIG. 10A), the end portions are configured with a thicker cross-section (e.g., FIG. 10D) as noted above to both resist operational deflection and reduce the effects of misalignment.

The specially configured journals illustrated in FIGS. 6 through 8, 9C, 9D, 10D, and 12 may be initially formed by an additive manufacturing technique such as, for example, direct metal laser sintering or electron beam melting. The initially formed specially configured journal manufactured by additive manufacturing methods may be encapsulated such that any surface connected defects (i.e. cracks, voids, lack of fusion and porosity) may effectively be considered internal defects. A consolidation treatment such as hot isostatic processing (HIP) may also be used to substantially eliminate internal defects, as well as any final treatments, to produce the finished specially configured journal. Manufacturing methods other than additive manufacturing may also be used to produce the specially configured journals.

From the foregoing, it is to be appreciated that the specially configured journals help resist operational deflection and reduce the effects of journal misalignment. A substantially uniform operational running clearance may be maintained, such that the load carrying capacity of the foil journal bearing assembly can be maintained over a range of temperatures and speeds with substantially no journal flowering occurring during operation. In addition, dynamic properties of the foil journal bearing assembly are maintained, and end loading of the journal relative to the foil bearing is substantially prevented.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A rotating assembly of turbomachinery, the rotating assembly comprising:
   a plurality of components mounted on a rotatable shaft within a housing of the turbomachinery; and
   at least one foil journal bearing assembly for mounting the rotatable shaft to the housing, the foil journal bearing assembly comprising:
      an annular bearing carrier mounted to the housing;
      an annular bearing sleeve disposed within the annular bearing carrier and attached thereto, the annular bearing sleeve lined with a plurality of foils; and
      a journal mounted to the rotatable shaft and having an outer surface engaging the foils,
   wherein the journal resists operational deflection, the journal has a stiffening rib that projects from one or more journal portions determined to be subject to operational deflection, and the stiffening rib projects from the journal toward the rotatable shaft.

2. The rotating assembly of claim 1, wherein the journal is configured to resist operational deflection thereof to maintain a substantially constant outer diameter along the length thereof during operation.

3. The rotating assembly of claim 2, wherein the stiffening rib provides the journal with a different cross section in one or more journal portions determined to be subject to operational deflection.

4. The rotating assembly of claim 3, wherein the stiffening rib provides the journal with a different cross section in at least one journal end portion determined to be subject to operational deflection.

5. The rotating assembly of claim 1, wherein the stiffening rib comprises at least one circumferential rib disposed in the circumferential direction of the rotatable shaft that projects from an inner circumference of the journal toward the rotatable shaft for stiffening the one or more journal portions.

6. The rotating assembly of claim 1, wherein the stiffening rib comprises at least one axial rib for stiffening the one or more journal portions.

7. The rotating assembly of claim 1, wherein the journal comprises a mid-span supported journal and the stiffening rib provides the mid-span supported journal with a different cross section in forward and aft end portions thereof relative to a mid-span portion thereof.

8. The rotating assembly of claim 1, wherein the journal comprises a cantilevered journal having a free end portion, the cantilevered journal includes the stiffening rib at the free end portion.

9. The rotating assembly of claim 1, wherein the journal is configured to reduce the effects of journal misalignment, and one or more journal end portions include the stiffening rib.

10. A foil journal bearing assembly comprising:
    an annular bearing carrier;
    an annular bearing sleeve disposed within the annular bearing carrier and attached thereto, the annular bearing sleeve lined with a plurality of foils;
    a journal having an outer surface that engages the foils, the journal adapted to rotate in close clearance relationship within the annular bearing sleeve for operation over a range of temperatures and speeds, the journal mounted to a rotatable shaft and having an outer surface engaging the foils; and
    wherein the journal resists operational deflection, the journal has a stiffening rib that projects from one or more journal portions determined to be subject to operational deflection, and the stiffening rib projects from the journal inward toward the rotatable shaft.

11. The foil journal bearing assembly of claim 10, wherein the journal is configured to resist operational deflection thereof to maintain a substantially constant outer diameter along the length thereof, thereby maintaining a substantially uniform operational running clearance with the foils.

12. The foil journal bearing assembly of claim 11, wherein the stiffening rib provides the journal with a different cross section in one or more journal portions determined to be subject to operational deflection.

13. The foil journal bearing assembly of claim 12, wherein the stiffening rib provides the journal with a different cross section in at least one journal end portion of the one or more journal portions determined to be subject to operational deflection.

14. The foil journal bearing assembly of claim 10, wherein the stiffening rib comprises at least one circumferential rib disposed in the circumferential direction of the rotatable shaft for stiffening the one or more journal portions.

15. The foil journal bearing assembly of claim 10, wherein the stiffening rib comprises at least one axial rib for stiffening the one or more journal portions.

16. The foil journal bearing assembly of claim 10, wherein the journal is configured to reduce the effects of journal misalignment, wherein one or more journal end portions include the stiffening rib.

* * * * *